(12) United States Patent
Ueda et al.

(10) Patent No.: US 11,611,272 B2
(45) Date of Patent: Mar. 21, 2023

(54) ROTATION OPERATION DEVICE

(71) Applicant: Yamaha Corporation, Hamamatsu (JP)

(72) Inventors: Taku Ueda, Toyohashi (JP); Hisanobu Suzuki, Hamamatsu (JP); Naoaki Kurita, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 161 days.

(21) Appl. No.: 17/168,521

(22) Filed: Feb. 5, 2021

(65) Prior Publication Data

US 2021/0249942 A1 Aug. 12, 2021

(30) Foreign Application Priority Data

Feb. 10, 2020 (JP) .............................. JP2020-020882

(51) Int. Cl.
*H02K 37/24* (2006.01)
*H02K 7/116* (2006.01)

(52) U.S. Cl.
CPC ............. *H02K 37/24* (2013.01); *H02K 7/116* (2013.01)

(58) Field of Classification Search
CPC .......... H02K 37/24; H02K 7/116; H02K 7/14; H02K 11/215
See application file for complete search history.

(56) References Cited

U.S. PATENT DOCUMENTS

2018/0254723 A1* 9/2018 Miyako .................. B60K 20/02
2018/0372216 A1* 12/2018 Yamanaka .............. F16H 61/24

FOREIGN PATENT DOCUMENTS

| JP | 2003323830 A | * | 11/2003 |
| JP | 2012174293 A | * | 9/2012 |
| JP | 5432026 B2 | | 3/2014 |

OTHER PUBLICATIONS

JP2012174293A English translation (Year: 2022).*
JP2003323830A English translation (Year: 2022).*

* cited by examiner

*Primary Examiner* — Tulsidas C Patel
*Assistant Examiner* — Viswanathan Subramanian
(74) *Attorney, Agent, or Firm* — Crowell & Moring LLP (57) ABSTRACT

A rotation operation device includes a stepping motor and an operation element. The stepping motor has a rotating shaft. The operation element is provided on the rotating shaft. The operation element also rotates the rotating shaft.

6 Claims, 6 Drawing Sheets

ROTATION OPERATION DEVICE

CROSS REFERENCE TO RELATED APPLICATION

Priority is claimed on Japanese Patent Application No. 2020-20882, filed Feb. 10, 2020, the content of which is incorporated herein by reference.

BACKGROUND

Field of the Invention

The present disclosure relates to a rotation operation device.

DESCRIPTION OF RELATED ART

A conventional rotation operation device (operation device) may be provided with an operation element (dial operation unit) capable of rotational operation, a stepping motor (dial drive motor) for rotationally driving the operation element, and a control unit for controlling the operation of the stepping motor. In this rotation operation device, the control unit executes control to generate static torque on the rotating shaft (output shaft) of the stepping motor to impart a click feeling to the rotation operation of the operation element by the operator.

However, in such a conventional rotation operation device, the operation element and the rotating shaft of the stepping motor are connected via gears (drive gear, driven gear). Therefore, there is a problem that the click feeling (static torque) of the stepping motor deteriorates in the gears and so is not directly transmitted to the fingers of the operator who operates the operation element. Since the degree of click feeling felt by the operator is related to the ease of operation of the operation element by the operator, it is preferable that the click feeling by the stepping motor be directly transmitted to the operator's fingers.

SUMMARY

The present disclosure has been made in view of the above circumstances, and an object of the present disclosure is to provide a rotation operation device capable of directly transmitting a click feeling by a stepping motor to the fingers of an operator operating an operation element.

One aspect of the present disclosure is a rotation operation device provided with a stepping motor that has a rotating shaft and an operation element that is provided on the rotating shaft and that rotates the rotating shaft. Other aspects and additional features of the present disclosure will become apparent with reference to the following drawings, in which:

DETAILED DESCRIPTION

Hereinbelow, an embodiment of the present disclosure will be described with reference to FIGS. 1 to 4.

Figure 1:
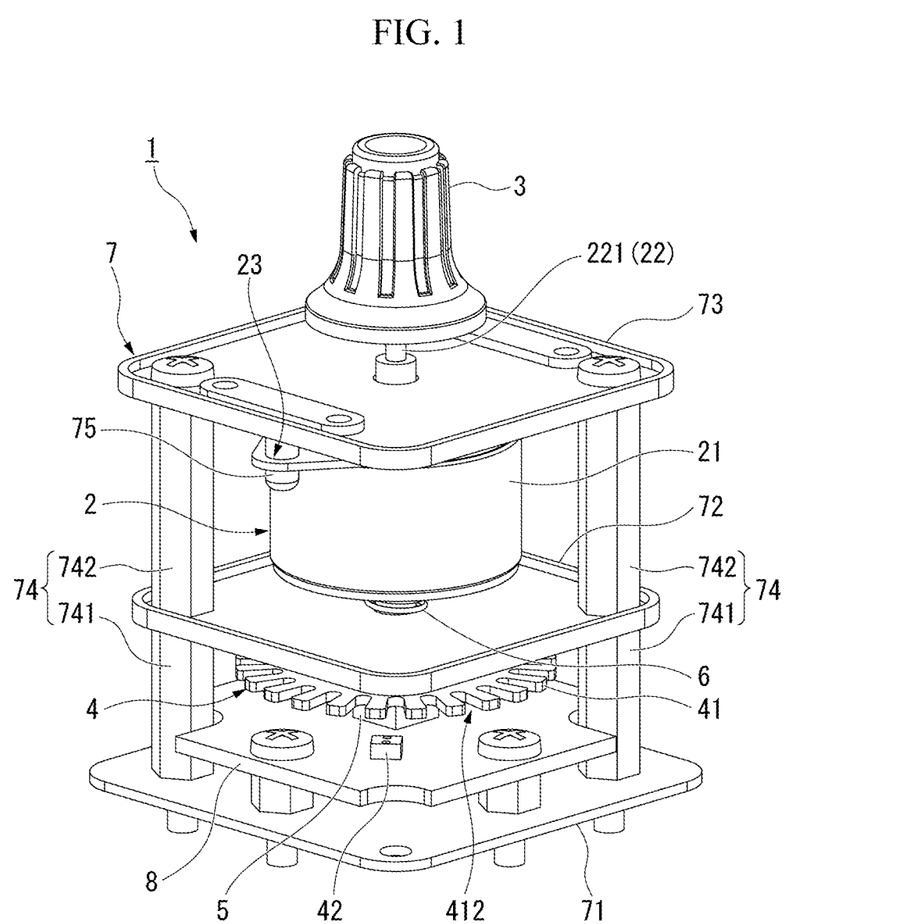
FIG. 1 is a perspective view showing a rotation operation device.
Figure 2:
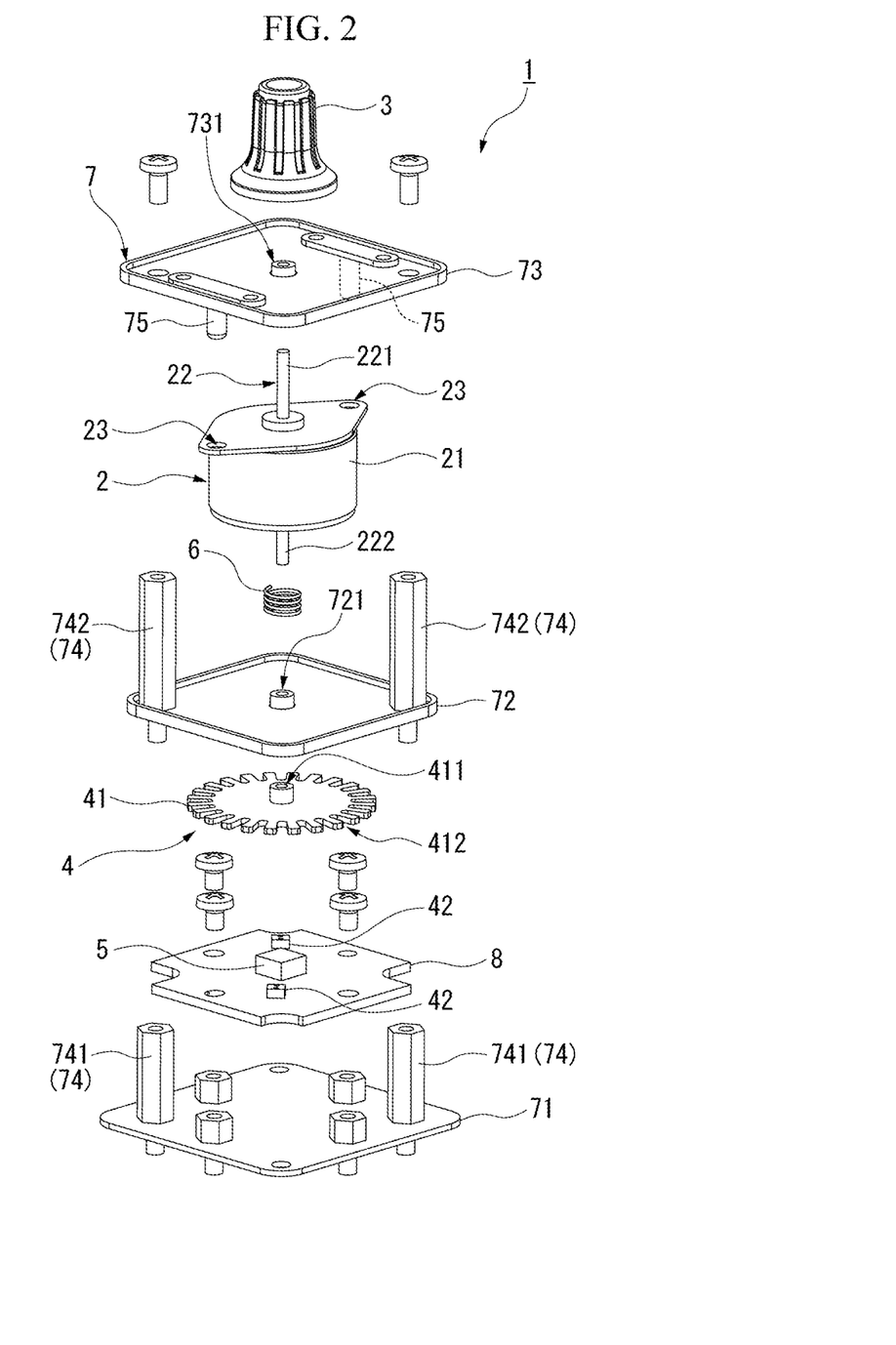
FIG. 2 is an exploded perspective view showing the structure of the rotation operation device shown in FIG. 1.
Figure 3:
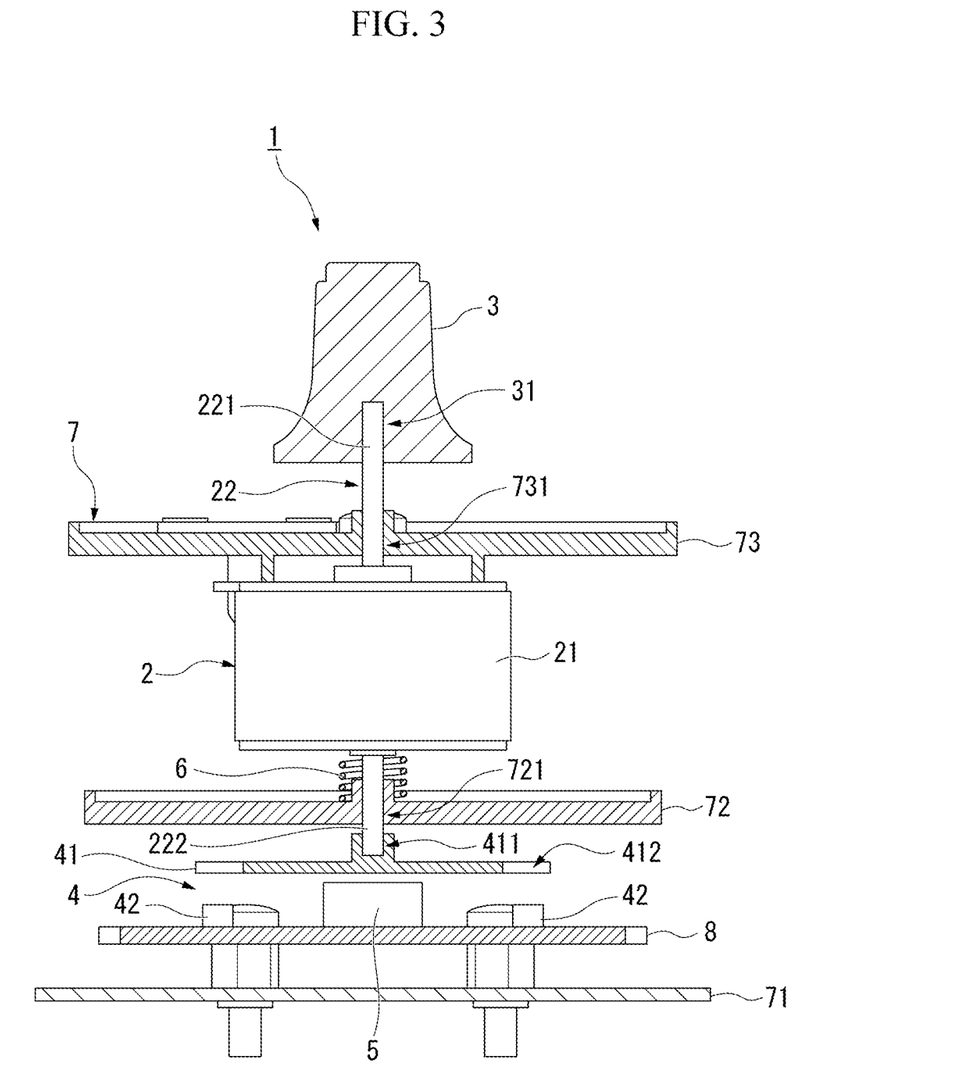
FIG. 3 is a cross-sectional view showing the structure of the rotation operation device shown in FIG. 1.

As shown in FIGS. 1 to 3, a rotation operation device 1 according to the present embodiment is provided with a stepping motor 2 and an operation element 3. Further, the rotation operation device 1 is provided with a rotation position detection unit 4, a switch 5, and an elastic member 6.

The stepping motor 2 has a motor body 21 and a rotating shaft 22. The rotating shaft 22 is rotatably attached to the motor body 21. A first end 221 and a second end 222 of the rotating shaft 22 in the axial direction extend from both sides of the motor body 21 in the axial direction of the rotating shaft 22. In the present embodiment, the rotating shaft 22 is immovable in the axial direction with respect to the motor body 21.

The stepping motor 2 is attached to a frame 7. The frame 7 is provided with a base plate 71, a lower support plate 72, an upper support plate 73, and a support column 74. The base plate 71, the lower support plate 72, and the upper support plate 73 are arranged in this order from the bottom to the top, being spaced apart in the thickness direction of these plates.

The support column 74 connects the base plate 71, the lower support plate 72, and the upper support plate 73. The support column 74 maintains the distance between the base plate 71, the lower support plate 72, and the upper support plate 73. The support column 74 includes a first support column member 741 and a second support column member 742. The first support column member 741 is interposed between the base plate 71 and the lower support plate 72, and keeps the distance between the base plate 71 and the lower support plate 72 constant. The second support column member 742 is interposed between the lower support plate 72 and the upper support plate 73, and keeps the distance between the lower support plate 72 and the upper support plate 73 constant. The first support column member 741 is fixed to the base plate 71 by screwing or the like. The second strut member 742 is fixed to the first support column member 741 by screwing or the like, so that the lower support plate 72 is sandwiched between the second support column member 742 and the first support column member 741. The upper support plate 73 is fixed to the tip of the second support column member 742 by screwing or the like. The number of columns 74 may be two as shown in the illustrated example, but is not limited thereto.

The motor body 21 of the stepping motor 2 is arranged between the lower support plate 72 and the upper support plate 73 of the frame 7. The first end 221 of the rotating shaft 22 is inserted into a through hole 731 formed in the upper support plate 73. The second end 222 of the rotating shaft 22 is inserted into a through hole 721 formed in the lower support plate 72. The diameter dimensions of the through holes 721 and 731 of the lower support plate 72 and the upper support plate 73 are equivalent to the diameter of the rotating shaft 22.

The rotating shaft 22 attached to the lower support plate 72 and the upper support plate 73 is rotatable with respect to the frame 7. The rotating shaft 22 is movable in the axial direction of the rotating shaft 22. The thickness of the through holes 721 and 731 of the lower support plate 72 and the upper support plate 73 is thicker than that of the other parts of the lower support plate 72 and the upper support plate 73. Thereby, the lengths of the through holes 721 and 731 in the lower support plate 72 and the upper support plate 73 are secured to be long, so that the rotating shaft 22 can be stably supported by the through hole 721.

The motor body 21 is not fixed to the lower support plate 72 or the upper support plate 73. As a result, the entire stepping motor 2 including the rotating shaft 22 and the motor body 21 is movably attached to the frame 7 in the axial direction of the rotating shaft 22. The axial movement range of the stepping motor 2 with respect to the frame 7 is mainly defined by the interval between the lower support plate 72 and the upper support plate 73.

A guide rod 75 is provided on the upper support plate 73. The guide rod 75 extends from the upper support plate 73 in parallel with the axial direction of the rotating shaft 22 at a position separated from the rotating shaft 22 (through hole 731) on a concentric circle of the rotating shaft 22. The guide rod 75 is inserted into a guide hole 23 formed in the motor body 21. Thereby, the motor body 21 is guided only in the axial direction of the rotating shaft 22 with respect to the frame 7, and does not rotate about the axis of the rotating shaft 22 with respect to the frame 7. The guide rod 75 may be provided on the lower support plate 72, for example.

The elastic member 6 applies an elastic force in the axial direction of the rotating shaft 22 to the stepping motor 2. The elastic member 6 is arranged between the motor body 21 and the lower support plate 72. As a result, when the stepping motor 2 is moved so as to be close to the base plate 71, the elastic member 6 is elastically deformed, and an elastic force in the direction of separating the stepping motor 2 from the base plate 71 is applied to the stepping motor 2. The elastic member 6 of the present embodiment is a coil spring, and is arranged so that the rotating shaft 22 is inserted therethrough. The elastic member 6 may also be an elastic body such as rubber or a cushion.

The operation element 3 is a component operated by the operator of the rotation operation device 1. The operation element 3 is provided on the rotating shaft 22 of the stepping motor 2. As shown in FIG. 3, an insertion hole 31 is formed in the operation element 3. The insertion hole 31 may penetrate, for example, the operation element 3, but does not do so in the present embodiment. The operation element 3 is attached to the first end 221 of the rotating shaft 22 by inserting the first end 221 of the rotating shaft 22 into the insertion hole 31 of the operation element 3. The operation element 3 attached to the first end 221 of the rotating shaft 22 is arranged at a position where the upper support plate 73 is interposed between the operation element 3 and the motor body 21.

The operation element 3 attached to the rotating shaft 22 does not rotate about the axis of the rotating shaft 22 with respect to the rotating shaft 22. Further, the operation element 3 does not move in the axial direction with respect to the rotating shaft 22. That is, the operation element 3 is fixed to the rotating shaft 22. As a result, the operation element 3 rotates about the axis of the rotating shaft 22 together with the rotating shaft 22 by the rotation of the stepping motor 2. Further, the operation element 3 can move in the rotation axis direction of the stepping motor 2 including the rotating shaft 22 and can move in the axial direction of the rotating shaft 22 with respect to the frame 7.

The rotation position detection unit 4 is provided on the rotating shaft 22 and detects the rotation position of the rotating shaft 22. The rotation position detection unit 4 includes a disc-shaped member 41 and a detection unit 42.

The disc-shaped member 41 is provided on the rotating shaft 22 and rotates together with the rotating shaft 22. An insertion hole 411 is formed in the central portion of the disc-shaped member 41. The insertion hole 411 may penetrate the disc-shaped member 41 in the plate thickness direction, for example, but does not penetrate in the present embodiment. The disc-shaped member 41 is fixed to the second end 222 of the rotating shaft 22 by inserting the second end 222 of the rotating shaft 22 into the insertion hole 411 of the disc-shaped member 41. The plate thickness of the disc-shaped member 41 in the central portion of the disc-shaped member 41 is thicker than the plate thickness of other portions of the disc-shaped member 41 located outside the central portion in the radial direction. As a result, the length of the insertion hole 411 of the disc-shaped member 41 can be secured, and the disc-shaped member 41 can be stably fixed to the rotating shaft 22. The disc-shaped member 41 fixed to the second end 222 of the rotating shaft 22 is arranged between the base plate 71 of the frame 7 and the lower support plate 72 in the axial direction of the rotating shaft 22.

The detection unit 42 detects the rotational position of the disc-shaped member 41. The detection unit 42 is arranged so as to face the outer peripheral portion of the disc-shaped member 41 in the plate thickness direction of the disc-shaped member 41. The number of detection units 42 may be one, for example, but in the present embodiment, a plurality of detection units 42 (two in the illustrated example) are arranged at intervals in the circumferential direction of the disc-shaped member 41.

The detection unit 42 is mounted on a circuit board 8. The circuit board 8 is fixed to the base plate 71 of the frame 7 by screwing or the like. Thereby, the circuit board 8 is provided so that the disc-shaped member 41 is located between the circuit board 8 and the motor body 21 in the axial direction of the rotating shaft 22.

The rotation position detection unit 4 of the present embodiment is a reflection type photo interrupter. Therefore, a plurality of slits 412 penetrating in the plate thickness direction of the disc-shaped member 41 are formed on the outer peripheral portion of the disc-shaped member 41. The plurality of slits 412 are arranged at equal intervals in the circumferential direction of the disc-shaped member 41. Further, the detection unit 42 includes a light emitting unit and a light receiving unit (not shown). In the illustrated example, the light emitting portion and the light receiving portion are integrated, but the present disclosure is not limited thereto.

In the rotation position detection unit 4, which is a reflection type photo interrupter, the light from the light emitting unit of the detection unit 42 reaches the light receiving unit by being reflected at the tooth portion at the outer peripheral portion of the disc-shaped member 41 in accordance with the rotation position of the rotating shaft 22. When the light from the light emitting portion of the detection unit 42 passes through the slits 412 in the outer peripheral portion of the disc-shaped member 41, the light does not reach the light receiving portion. The rotation position detection unit 4 can detect the rotation position of the rotating shaft 22 on the basis of whether or not the light receiving unit of the detection unit 42 receives the light from the light emitting unit.

The rotation position detection unit 4 may be, for example, a transmissive photo interrupter. Further, the detection unit 42 of the rotation position detection unit 4 may be, for example, a Hall element. When the detection unit 42 is a Hall element, magnets in which the N poles and S poles are alternately arranged in the circumferential direction of the disc-shaped member 41 should be provided on the outer peripheral portion of the disc-shaped member 41 instead of the slits 412.

A switch 5 is operated by operating the operation element 3 so as to move in the direction of the switch 5. The switch 5 of the present embodiment is a push button switch that operates by receiving an external force in the axial direction of the rotating shaft 22. The push button switch may be, for example, a Tact switch, a membrane switch, a pressure switch, or the like. The switch 5 is not limited to a push button switch, and may be, for example, an optical switch or a capacitance type switch.

The switch 5 faces the distal end of the second end 222 of the rotating shaft 22 in the axial direction of the rotating shaft 22. The switch 5 is mounted on the circuit board 8 fixed to the base plate 71, similarly to the detection unit 42. The switch 5 is operated by the stepping motor 2 and the operation element 3 moving toward the switch 5 in the axial direction of the rotating shaft 22. In the present embodiment, the switch 5 is operated by the rotating shaft 22 of the stepping motor 2 pushing the switch 5.

Figure 4:
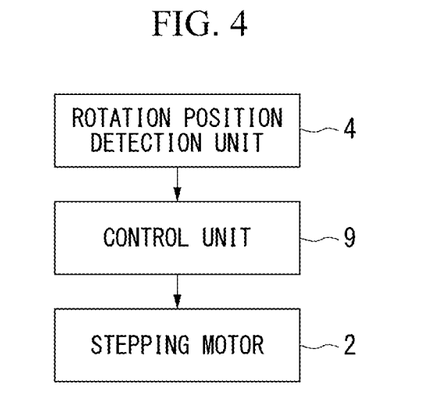
FIG. 4 is a block diagram showing the function of the rotation operation device.

As shown in FIG. 4, the rotation operation device 1 is further provided with a control unit 9. The control unit 9 controls the stepping motor 2 according to the rotation position of the rotating shaft 22 output from the rotation position detection unit 4 to generate static torque in the stepping motor 2. As a result, a click feeling is imparted to the rotation operation of the operation element 3 by the operator. The number of click points per rotation of the operation element 3 (rotating shaft 22) can be arbitrarily set.

In the rotation operation device 1 of the present embodiment configured as described above, the operator can rotate the operation element 3. At this time, the click feeling from the stepping motor 2 is transmitted to the fingers of the operator. Thereby, the operator can ascertain how much the operation element 3 has been rotated without visually recognizing the operation element 3.

Further, in the rotation operation device 1, the operator can push the operation element 3 in the axial direction of the rotating shaft 22. At this time, the stepping motor 2 and the operation element 3 move so as to approach the switch 5 (base plate 71), and the switch 5 operates. Further, the elastic member 6 imparts an elastic force in a direction to separate the stepping motor 2 and the operation element 3 from the switch 5. For this reason, when the operator has released the pushing operation of the operation element 3, the stepping motor 2 and the operation element 3 move in the direction away from the switch 5 due to the elastic force of the elastic member 6, and the operation of the switch 5 is released.

As described above, according to the rotation operation device 1 of the present embodiment, since the operation element 3 is directly provided on the rotating shaft 22 of the stepping motor 2, a gear or the like is not interposed between the operation element 3 and the rotating shaft 22. As a result, the click feeling of the stepping motor 2 can be directly transmitted to the fingers of the operator who operates the operation element 3.

In the rotation operation device 1 of the present embodiment, the first end 221 and the second end 222 of the rotating shaft 22 are located on both sides of the motor body 21 in the axial direction. The operation element 3 is provided at the first end 221 of the rotating shaft 22, and the disc-shaped member 41 of the rotation position detection unit 4 is provided at the second end 222 of the rotating shaft 22.

Therefore, as compared with the case where the operation element 3 and the disc-shaped member 41 are provided only on one of the first end 221 and the second end 222 of the rotating shaft 22, it is possible to shorten the length of the rotating shaft 22 from the motor body 21 to the first end 221 and the length of the rotating shaft 22 from the motor body 21 to the second end 222. Therefore, it is possible to suppress bending or shaking of the rotating shaft 22. Thereby, it is possible to prevent the click feeling caused by the stepping motor 2 from deteriorating due to the bending or shaking of the rotating shaft 22. Therefore, the click feeling of the stepping motor 2 can be directly transmitted by the fingers of the operator who operates the operation element 3.

Further, in the rotation operation device 1 of the present embodiment, the entire stepping motor 2 including the motor body 21 and the rotating shaft 22 moves in the axial direction together with the operation element 3. Therefore, even if the operation element 3 is moved in the axial direction, the relative positions with the motor body 21 and the rotating shaft 22 do not change. As a result, even if the position of the operation element 3 in the axial direction changes, it is possible to prevent a change in the click feeling caused by the stepping motor 2.

Further, in the rotation operation device 1 of the present embodiment, the stepping motor 2 can be moved together with the operation element 3 so as to move away from or toward the switch 5. The switch 5 is operated by the stepping motor 2 and the operation element 3 moving toward the switch 5. As a result, the operation element 3 and the stepping motor 2 can be used as parts for operating the switch 5. Since it is not necessary to separately prepare a component for operating the switch 5, the rotation operation device 1 including the switch 5 can have a simple configuration.

Further, the rotation operation device 1 of the present embodiment is provided with the elastic member 6 that imparts an elastic force in the direction in which the stepping motor 2 and the operation element 3 are separated from the switch 5. As a result, the operator, from the state of bringing the stepping motor 2 and the operation element 3 close to the switch 5 to operate the switch 5, can put the stepping motor 2 and the operation element 3 in a state of separating from the switch 5 by the elastic force of the elastic member 6 just by releasing from the hand the operation element 3. That is, the operation of the switch 5 can be easily released.

Figure 5:
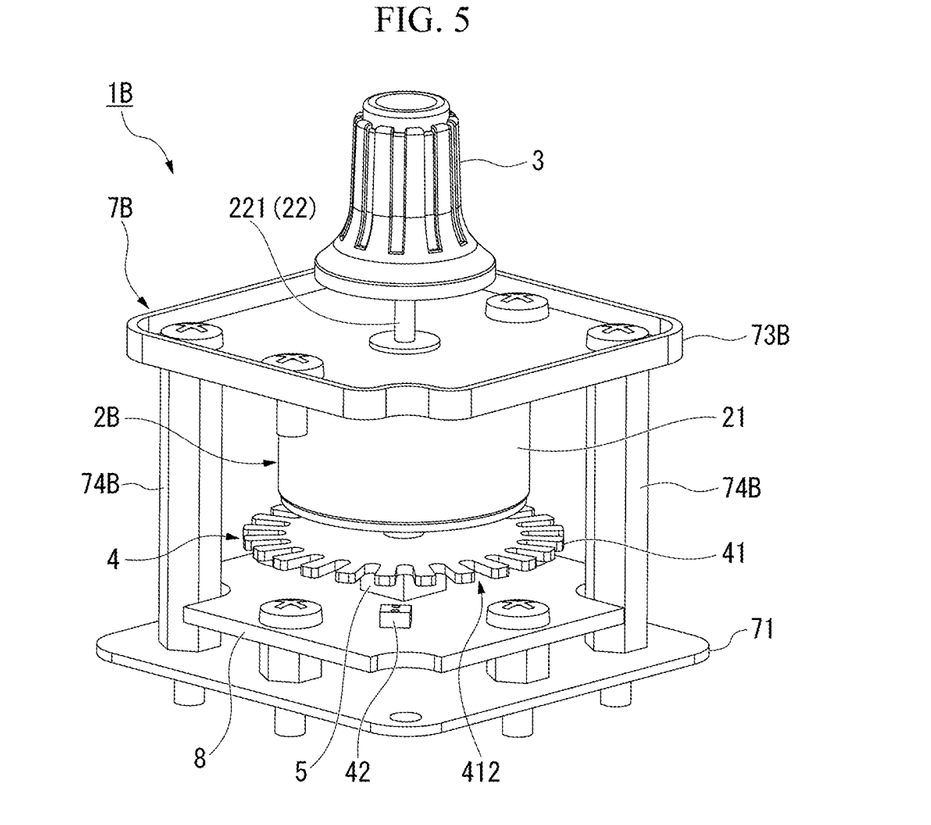
FIG. 5 is a perspective view showing the rotation operation device.
Figure 6:
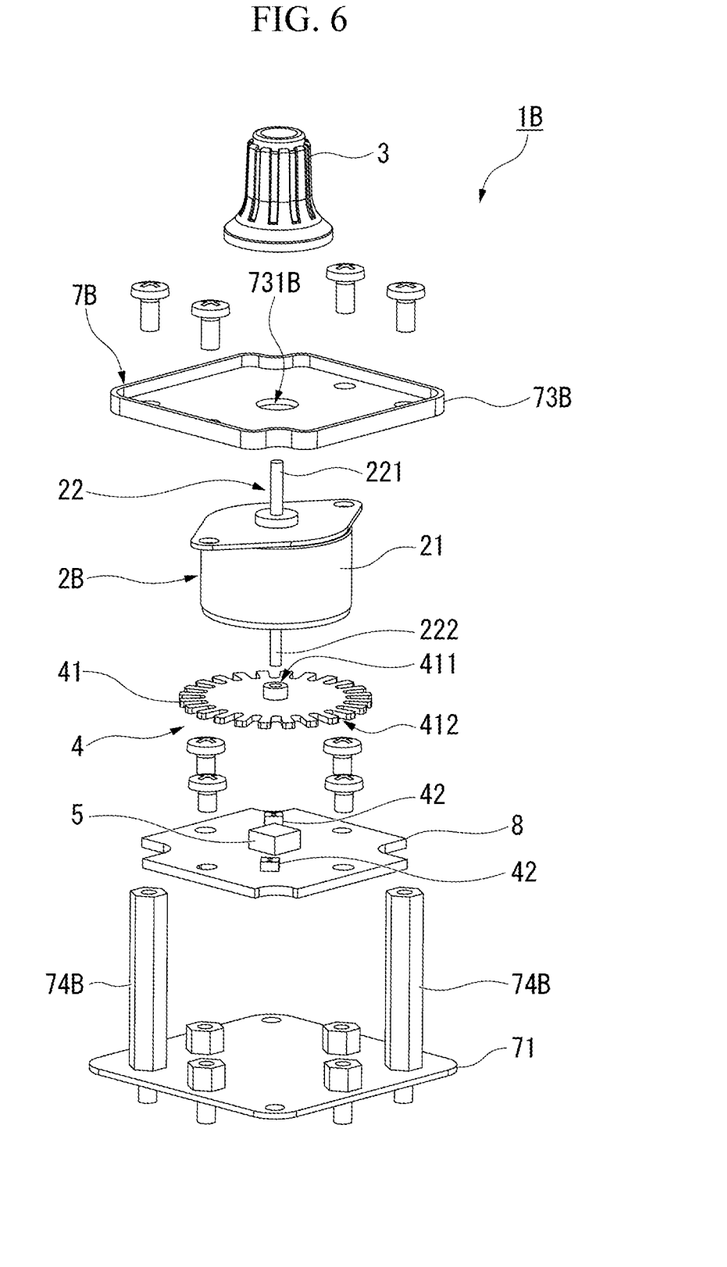
FIG. 6 is an exploded perspective view showing the structure of the rotation operation device shown in FIG. 5.
Figure 7:
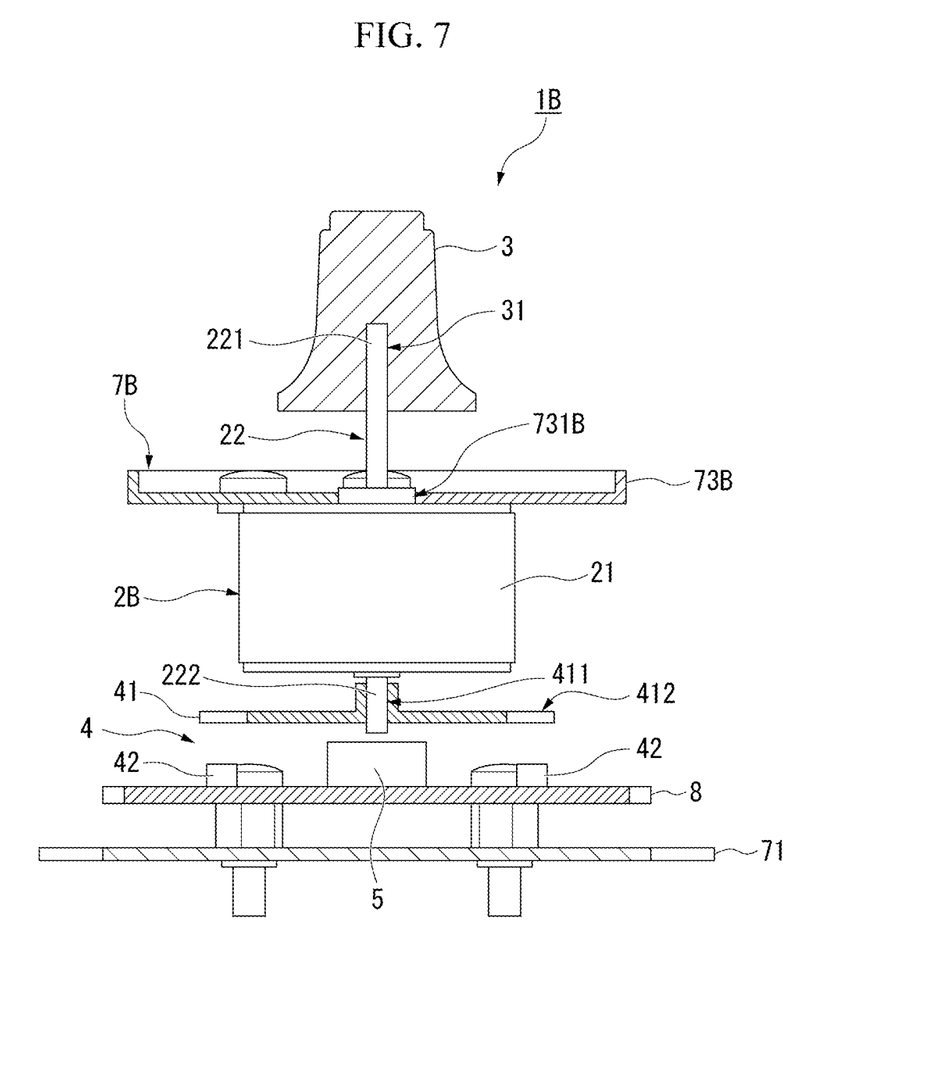
FIG. 7 is a cross-sectional view showing the structure of the rotation operation device shown in FIG. 5.

With reference to FIGS. 5 to 7, the same components as those in the above embodiment are designated by the same reference numerals, and descriptions thereof will be omitted.

As shown in FIGS. 5 to 7, a rotation operation device 1B is provided with a stepping motor 2B, the operation element 3, the rotation position detection unit 4, and the switch 5. Further, although not shown in FIGS. 5 to 7, the rotation operation device 1B also is also provided with the control unit 9 (see FIG. 4) for imparting a click feeling to the rotation operation of the operation element 3.

In the stepping motor 2B, the rotating shaft 22 is capable of moving together with the operation element 3 in the axial direction of the rotating shaft 22 with respect to the motor body 21. Further, an elastic member (not shown) is provided between the motor body 21 and the rotating shaft 22. The elastic member imparts an elastic force in a direction separating the rotating shaft 22 from the switch 5 with respect to the motor body 21 (upward in FIG. 7).

The stepping motor 2B is attached to a frame 7B. The frame 7B is provided with the base plate 71, a support plate 73B, and a support column 74B. The base plate 71 and the support plate 73B are arranged spaced apart in the thickness direction of these plates. The support column 74B connects the base plate 71 and the support plate 73B, and maintains the interval between the base plate 71 and the support plate 73B. By being interposed between the base plate 71 and the support plate 73B, the support column 74B keeps the interval between the base plate 71 and the support plate 73B constant. The support column 74B is fixed to the base plate 71 by screwing or the like. The support plate 73B is fixed to the tip of the support column 74B by screwing or the like.

The motor body 21 is fixed to the support plate 73B by screwing or the like, and is arranged between the base plate 71 and the support plate 73B. The first end 221 of the rotating shaft 22 is inserted into a through hole 731B formed in the support plate 73B. The diameter of the through hole 731B of the support plate 73B should be equal to or larger than the diameter of the rotating shaft 22.

In a state where the motor body 21 is fixed to the support plate 73B, the rotating shaft 22 can move in the axial direction of the rotating shaft 22 with respect to the motor body 21 and the frame 7B. Further, the distal end of the second end 222 of the rotating shaft 22 faces the switch 5 in the axial direction of the rotating shaft 22.

The rotation position detection unit 4 is provided with the disc-shaped member 41 and the detection unit 42 similar to those discussed earlier. However, the insertion hole 411 formed in the disc-shaped member 41 of the rotation position detection unit 4 penetrates in the plate thickness direction of the disc-shaped member 41. For this reason, the second end 222 of the rotating shaft 22 is inserted into the insertion hole 411 of the disc-shaped member 41 and faces the switch 5 without the disc-shaped member 41 interposing therebetween.

In the rotation operation device 1B configured as described above, when the operator rotates the operation element 3, a click feeling is transmitted by the stepping motor 2B to the operator's fingers.

Further, in the rotation operation device 1B, the operator can push the operation element 3 in the axial direction of the rotating shaft 22. At this time, the rotating shaft 22 moves together with the operation element 3 with respect to the motor body 21 so as to approach the switch 5, and the switch 5 operates. On the other hand, when the operator releases the pushing operation of the operation element 3, the operation element 3 and the rotating shaft 22 move in the direction away from the switch 5 by the elastic force of the elastic member provided between the motor body 21 and the rotating shaft 22, whereby the operation of the switch 5 is released.

According to the rotation operation device 1B, the same effect as that disclosed earlier is obtained.

In the rotation operation device 1B, the rotating shaft 22 of the stepping motor 2B is movable together with the operation element 3 in the axial direction of the rotating shaft 22 with respect to the motor body 21. As a result, the motor body 21, which is heavier than the rotating shaft 22, can be fixed to the frame 7B. Accordingly, the stepping motor 2B can be attached to the frame 7B more easily and stably as compared with the case where the entire stepping motor 2B is movably attached to the frame 7B. Further, since the lower support plate 72 and the guide rod 75 (see FIGS. 1 to 3) are not required as compared with the frame 7 disclosed earlier, the number of component parts of the frame 7B is reduced, whereby a simplification of the frame 7B can be achieved. Further, since the heavy motor body 21 does not move in the axial direction together with the operation element 3 and the rotating shaft 22, the operation element 3 can be moved in the axial direction with a smaller force. That is, the operation of moving the operation element 3 in the axial direction can be easily performed.

Further, in the rotation operation device 1B, the rotating shaft 22 of the stepping motor 2B is movable together with the operation element 3 so as to move away from or toward the switch 5. By the rotating shaft 22 and the operation element 3 moving toward the switch 5, the switch 5 operates. Thereby, the operation element 3 and the rotating shaft 22 can be utilized as components for operating the switch 5. Since it is not necessary to separately prepare a component for operating the switch 5, the rotation operation device 1B including the switch 5 can be constituted in a simple manner.

While preferred embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

In the rotation operation device of the present disclosure, the switch 5 is not limited to operating along with movement of the stepping motors 2 and 2B and the rotating shaft 22 thereof in the axial direction, and may, for example, operate only in tandem with the movement of the operation element 3 in the axial direction. That is, the switch 5 may be operated by only the operation element 3 heading toward the switch 5. In this case, the operation element 3 may be attached to the rotating shaft 22 so as to rotate with the rotating shaft 22 and to be movable in the axial direction with respect to the rotating shaft 22. Further, the switch 5 may be provided on the upper support plate 73 or the support plate 73B so as to face the operation element 3 in the axial direction of the rotating shaft 22. In addition, an elastic member that imparts an elastic force in a direction separating the operation element 3 from the switch 5 with respect to the rotating shaft 22 may be provided between the operation element 3 and the rotating shaft 22.

Such a configuration eliminates the need to move the stepping motors 2 and 2B and the rotating shaft 22 thereof in the axial direction in order to operate the switch 5. Thereby, the stepping motors 2 and 2B and the frames 7 and 7B to which the stepping motors 2 and 2B are respectively attached can be simplified.

In the rotation operation device of the present disclosure, the detection unit 42 of the rotation position detection unit 4 may be provided at a portion of the motor body 21 facing the disc-shaped member 41 in the axial direction of the rotating shaft 22, for example. In this case, since the rotation position detection unit 4 is integrated with the stepping motors 2 and 2B, the rotation operation device can be easily assembled.

In the rotation operation device of the present disclosure, the rotating shaft 22 may extend from only one side of the motor body 21 in the axial direction thereof.

According to the present disclosure, the click feeling of the stepping motor can be directly transmitted to the fingers of the operator who operates the operation element.

What is claimed is:
1. A rotation operation device comprising:
a stepping motor that has a rotating shaft; and
an operation element that is provided on the rotating shaft and that rotates the rotating shaft, wherein:

the operation element is configured to be movable together with the rotating shaft in an axial direction of the rotating shaft, the rotation operating device further comprises a switch that is operated by the operation element moving in the axial direction, the stepping motor has a motor body to which the rotating shaft is rotatably attached, and the rotating shaft, the motor body, and the operation element are movable with respect to the switch.

2. The rotation operation device according to claim 1, wherein the rotating shaft extends from both sides of the motor body in an axial direction of the rotating shaft;

the operation element is provided at a first end of the rotating shaft; and wherein the rotation operation device further comprises:

a rotation position detection unit that is configured to detect the rotation position of the rotating shaft and that is provided at a second end of the rotating shaft located on a side opposite to the first end.

3. The rotation operation device according to claim 1, wherein the stepping motor is movable in the axial direction together with the operation element.

4. The rotation operation device according to claim 3, wherein the switch is operated by the stepping motor moving in the direction toward the switch.

5. The rotation operation device according to claim 1, wherein the switch is operated by the rotating shaft moving in the direction of the switch.

6. The rotation operation device according to claim 1, further comprising: an elastic member that imparts an elastic force to at least the operation element in a direction in which the operation element is separated from the switch.

* * * * *